Figure 1:
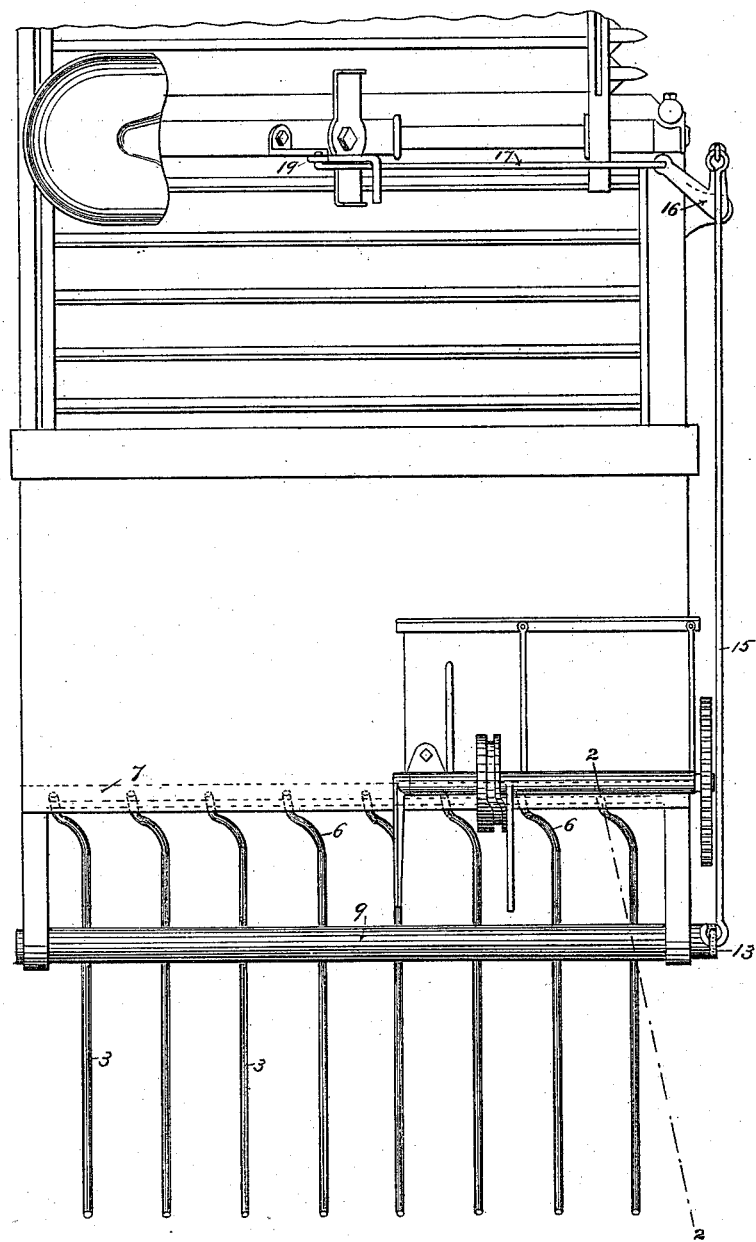

(Model.) 2 Sheets—Sheet 1.

O. J. FOSS.
BUNDLE CARRIER FOR HARVESTERS.

No. 383,718. Patented May 29, 1888.

Witnesses.
R. H. Sanford.
Richard Paul.

Inventor.
Oscar J. Foss,
By A. C. Paul.
Atty.

(Model.) 2 Sheets—Sheet 2.
O. J. FOSS.
BUNDLE CARRIER FOR HARVESTERS.
No. 383,718. Patented May 29, 1888.
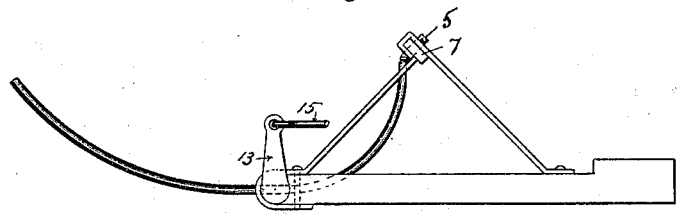
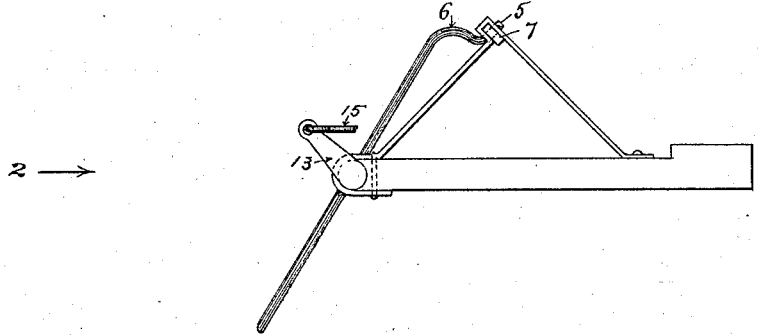
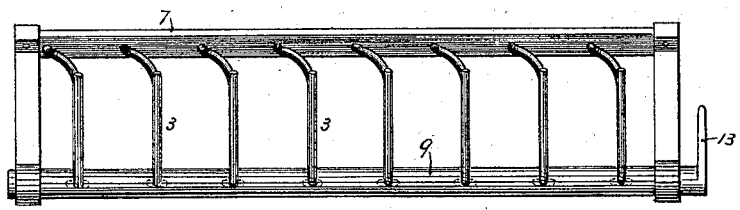
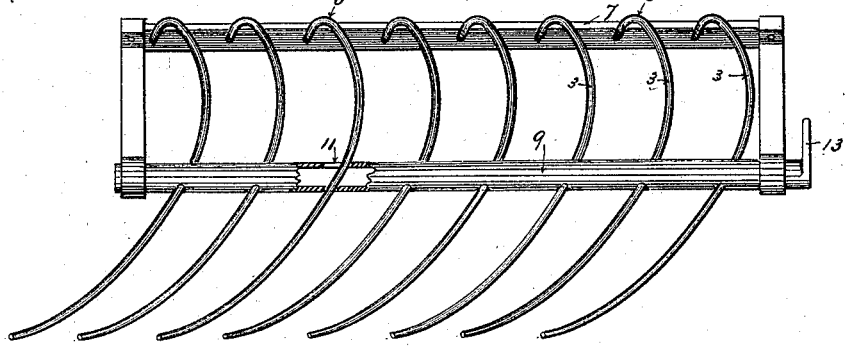
Witnesses,
R. H. Sanford.
Richard Paul
Inventor.
Oscar J. Foss.
By A. C. Paul, atty.

United States Patent Office.

OSCAR J. FOSS, OF MINNEAPOLIS, MINNESOTA.

BUNDLE-CARRIER FOR HARVESTERS.

SPECIFICATION forming part of Letters Patent No. 383,718, dated May 29, 1888.

Application filed April 13, 1886. Serial No. 198,693. (Model.)

*To all whom it may concern:*

Be it known that I, OSCAR J. FOSS, of Minneapolis, in the county of Hennepin and State of Minnesota, have invented certain Improvements in Bundle-Carriers for Harvesters, of which the following is a specification.

This invention relates to improvements in carriers for receiving bundles of grain as they are discharged from the binding mechanism of a self-binding harvester and dropping them in bunches for convenience in shocking.

The invention consists in the construction and combination hereinafter described, and pointed out in the claims.

In the drawings which form a part of this specification, Figure 1 is a plan of a portion of a harvester with my invention applied thereto. Fig. 2 is a side elevation of the carrier in position for receiving and holding the bundles. Fig. 3 is a similar view showing the carrier "dumped" to discharge the bundles. Fig. 4 is an elevation of the carrier, looking in the direction of the arrow 1 in Fig. 2. Fig. 5 is an elevation, looking in the direction of arrow 2 in Fig. 3.

The carrier is formed essentially of a series of holding-arms, which are mounted on a suitable support by means of inclined pivots and are capable of a downward and backward movement to discharge the bundles, and a rock bar or shaft that forms a support for the arms at a point between their pivots and their outer ends, and means under the control of the operator for rocking the shaft on its axis, and thereby causing the arms to be turned into position to receive the bundles or into position to discharge them.

In the drawings, 3 represents the curved carrier-arms, which are preferably formed of metal, and of substantially the form shown. The inner ends of the arms are provided with inclined pivots, which are mounted so as to rotate in the bar 7, that is secured to the harvester-frame, preferably just beneath the binding mechanism. The arms are capable of turning freely upon their inclined pivots, and have therefore a downward and backward movement, turning from the position shown in Figs. 2 and 4 to that shown in Figs. 3 and 5. A rock bar or shaft is mounted in suitable supports and extends substantially parallel with the bar 7, in which the arms are pivoted.

The shaft 9 may be solid, but I prefer to use a hollow shaft, as shown in Fig. 5. This shaft has a series of transverse slots, 1 1, through which the arms 3 extend. The outer ends of the slots, or those toward the outer ends of the arms, are of substantially the size of the arms, or only enough larger to allow the arms to turn freely in them. The inner ends of the slots are extended in the direction of the length of the shaft, their length in this direction being preferably several times the diameter of the arms. In the opposite direction the slots are preferably only large enough to permit a free movement of the arms on their axes. The rock-shaft may be made of wood or metal, and the slots may be made through the bar or in separate pieces attached thereto. The center of the shaft 9 is substantially in line with the pivoted portions 5 of the arms 3—that is to say, the axial lines of the pivots extended pass through the center of the shaft 9, as indicated by the line 2 2 in Fig. 1.

It will be understood that the center of the shaft 9 does not change its position as the shaft is rotated on its axis, but the outer ends of the slots 1 1 move downward and the inner ends move upward as the shaft is rocked to dump the carrier, and thereby the portions of the arms that are outside of the center of the shaft will be moved downward, while the parts between the center of the shaft and the pivoted ends 5 will move upward from the position shown in Fig. 2 to that shown in Fig. 3. The portions of the arms that are between the pivoted ends and the rock-shaft extend below a line passing from the pivoted ends to the center of the rock-shaft, and the parts that are outside of the rock-shaft extend above this line when the carrier is in position for receiving bundles. When the carrier is dumped, these positions are reversed, as shown in Fig. 3, and the bundles slide off from the arms.

As shown in Fig. 1, the pivoted ends of the arms are preferably oblique to the plane of their main portions, and the portions of the arms that are outside of the rock-shaft are preferably of sufficient weight to automatically turn the arms on their axes from the position shown in Fig. 2 to that shown in Fig. 3.

The rock-bar is provided with an arm, 13, that is connected by suitable mechanism with a foot or hand lever near the operator for releasing or dumping the carrier and returning and locking the same in position thereafter. This mechanism may consist of a rod, 15, that connects the arm 13 on the rock-bar with a bell-crank lever, 16. The opposite arm of the lever is connected by a rod, 17, with a suitable foot rest or lever, 19. The bell-crank lever is preferably arranged so as to pass beyond the dead-center, and thereby form a lock for the rod 15, in a manner well known for devices of a similar character.

As soon as the locking device is released the weight of the outer portion of the arms, together with the bundles thereon, causes the arms to turn upon their axes into substantially the position shown in Figs. 3 and 5, and the bundles slide to the ground. By means of the mechanism operated by the foot or hand lever the rock-bar may be turned and the arms brought back into holding position.

The portion of the arms between the rock-bar and the bar 7 may follow substantially the axial line 2 2. I prefer to form the arms with the offset 6, substantially as shown in Figs. 1, 3, and 5. When the arms are turned, the portion between the rock-shaft and the bar 7 moves upward around the axis, thereby bringing this part of the arms into the same inclined plane with the part of the other side of the rock-shaft, as shown in Fig. 3, giving the arms a greater declivity than they would otherwise have, and thereby greatly facilitating the discharge of all the bundles from the carrier. This portion of the arms that is below the axis when the arms are in carrying position also exerts a push or thrust against the bundles as the arms rotate, which aids in discharging the bundles therefrom.

I have shown the main portions of the arms of a curved form, but they may be of any suitable shape that is adapted to receive and hold the bundles.

The rock-bar forms a support for the arms at a point near the center of their length, and thereby lighter carrier-arms may be used and a more rigid carrier obtained.

I claim as my invention—

1. In a bundle-carrier, a series of carrying-arms mounted in a suitable support by pivoted ends whose axial lines are oblique to the plane of the arms, in combination with a shaft having a series of transverse wedge-shaped slots, through which said arms pass, and means for turning said shaft on its axis, and thereby turning said arms on their pivots, substantially as described.

2. In a bundle carrier for harvesters, the combination, with a series of carrying or holding arms mounted in a suitable support by pivoted ends whose axial lines are oblique to the plane of the arms and capable of a partial rotation on their axes to dump their load, of the supporting and operating rock-shaft located between the pivotal supports of the arms and their free ends, and provided with a series of transverse wedge-shaped slots, through which said arms pass, substantially as described, and for the purpose set forth.

3. In a bundle-carrier for harvesters, a series of carrying or holding arms mounted in a suitable support by pivoted ends whose axial lines are oblique to the plane of the arms, and provided near their upper ends with offset portions that move upward against the bundles as the arms are turned on their axes, in combination with operating mechanism for turning the said arms, substantially as described.

In testimony whereof I have hereunto set my hand this 7th day of April, 1886.

OSCAR J. FOSS.

In presence of—
D. STRUNK,
A. C. PAUL.